United States Patent
Carter et al.

(10) Patent No.: US 11,836,204 B1
(45) Date of Patent: Dec. 5, 2023

(54) SOCIAL COLLABORATION PLATFORM FOR FACILITATING RECOMMENDATIONS

(71) Applicant: FLAIRE LLC, Atlanta, GA (US)

(72) Inventors: Julia Carter, Atlanta, GA (US); Hillary Degenkolb, Atlanta, GA (US); Anne Louise Portwood, Atlanta, GA (US); Jordan Harris, Greenville, SC (US); Eddie Atkinson, Woodstock, GA (US)

(73) Assignee: FLAIRE LLC, Atlanta, GA (US)

( * ) Notice: Subject to any disclaimer, the term of this patent is extended or adjusted under 35 U.S.C. 154(b) by 78 days.

(21) Appl. No.: 17/099,770

(22) Filed: Nov. 16, 2020

Related U.S. Application Data

(60) Provisional application No. 63/114,380, filed on Nov. 16, 2020, provisional application No. 62/935,565, filed on Nov. 14, 2019.

(51) Int. Cl.
*G06F 16/95* (2019.01)
*G06F 40/30* (2020.01)
*G06F 16/9536* (2019.01)
*G06F 16/9532* (2019.01)
*G06F 16/9538* (2019.01)
*G06F 16/9535* (2019.01)

(52) U.S. Cl.
CPC ...... *G06F 16/9536* (2019.01); *G06F 16/9532* (2019.01); *G06F 16/9535* (2019.01); *G06F 16/9538* (2019.01); *G06F 40/30* (2020.01)

(58) Field of Classification Search
CPC ............. G06F 16/9536; G06F 16/9532; G06F 16/9535; G06F 16/9538; G06F 40/30
See application file for complete search history.

(56) References Cited

U.S. PATENT DOCUMENTS

| | | | | |
|---|---|---|---|---|
| 9,087,097 | B1* | 7/2015 | Balakrishnan | G06Q 30/0625 |
| 2003/0028451 | A1* | 2/2003 | Ananian | H04L 63/102 |
| | | | | 705/26.42 |
| 2010/0250583 | A1* | 9/2010 | Klemm | G06Q 10/10 |
| | | | | 709/204 |
| 2012/0130847 | A1* | 5/2012 | Kalin | G06Q 30/0641 |
| | | | | 705/26.7 |
| 2016/0162502 | A1* | 6/2016 | Zhou | G06F 16/3322 |
| | | | | 707/722 |
| 2016/0259790 | A1* | 9/2016 | Mashiach | G06F 16/9535 |
| 2017/0011446 | A1* | 1/2017 | Reinsberg | G06Q 30/0627 |

OTHER PUBLICATIONS

Nathan Eagle; Social Serendipity: Mobilizing Social Software; IEEE; 2005; pp. 28-34 (Year: 2005).*

* cited by examiner

*Primary Examiner* — Albert M Phillips, III
*Assistant Examiner* — Jermaine A Mincey
(74) *Attorney, Agent, or Firm* — Haley Guiliano LLP

(57) ABSTRACT

Systems and methods are described herein that address the shortcomings in conventional systems via a novel technique for utilizing a social interactions and knowledge about social connections to facilitate the exchange of information from a source of the information to a consumer of the information. For example, a consumer of information may be any individual or entity seeking information. A provider of information may be any entity or individual that may provide the information sought by the consumer. As provided herein, the systems identify providers that may most efficiently provide accurate information to the consumer without requiring the consumer to waste time reviewing irrelevant information.

18 Claims, 8 Drawing Sheets

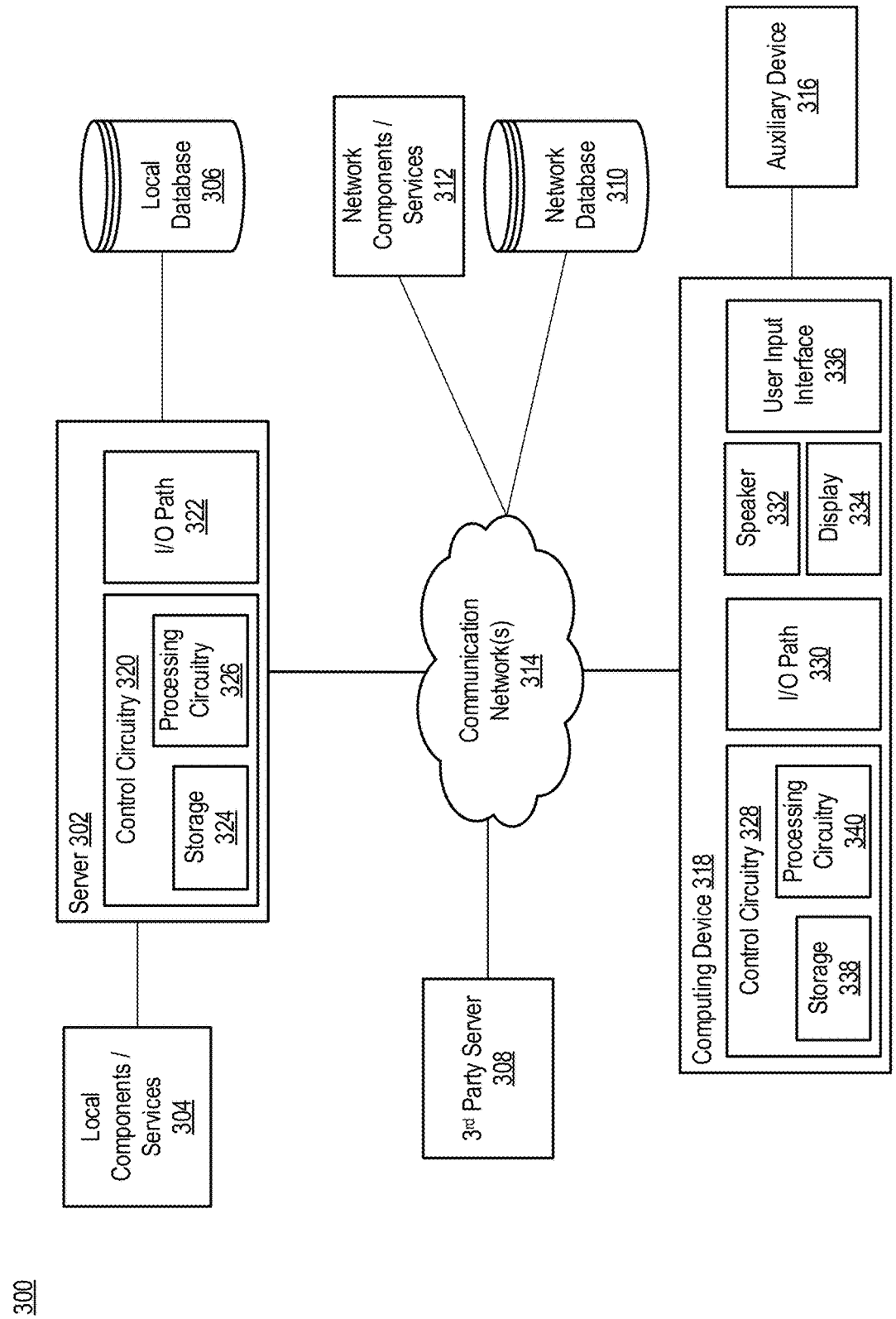

SOCIAL COLLABORATION PLATFORM FOR FACILITATING RECOMMENDATIONS

CROSS-REFERENCE TO RELATED APPLICATIONS

This application claims priority to U.S. Provisional Patent Application Ser. No. 62/935,565, filed Nov. 14, 2019, and entitled "Social Collaboration Platform for Facilitating Recommendations" (hereinafter the "'565 Provisional Application") and U.S. Provisional Patent Application Ser. No. 63/114,380, filed Nov. 16, 2020, entitled "Social Collaboration Platform for Facilitating Recommendations Using a Social Graph" (hereinafter the "'380 Provisional Application"), both of which are incorporated by reference herein in their entirety.

BACKGROUND

The internet has ushered the population into an era of information and option overload. Discovering, presenting, and identifying products, content, and services that individuals want and need poses many problems for the individual and for the sellers and producers of those products, content, and services.

Traditionally, individuals perused through physical magazines and catalogs, attended shows and gatherings, and, most often, visited physical stores and information centers. As of late, however, most individuals turn to the Internet, which is neither safe nor efficient. Conventional Internet tools, such as a search engine, oftentimes make it difficult for a consumer to identify and select from one of the potentially many possible options. For example, when a consumer searches for "Best restaurant" on a conventional search engine, the search engine may return hundreds of restaurants each purporting to be the best. In many instances, the multiple results are irrelevant to the consumer, thereby waste the consumer's time.

An individual can easily lose time, become distracted, and experience a sense (often subconscious) of mental paralysis, incompetence, and deflated self-worth due to information overload and the subsequent loss of productivity. The individual may also receive false information via fake or inaccurate reviews or miss a less expensive or higher quality item that is available, all of which lead to a sub-optimal purchase. Conventional system result in an inefficiency is rampant amongst individuals and communities.

Conventional systems also present problems for the sellers and/or producers who are unable to make the connection with the individuals and communities who would have preferred their materials. Much of this is due to the struggle for visibility and the broken system of advertising, whereby the brands and the users are often at odds with one another (the brand oftentimes wanting to extract information from the consumers while the consumers feel that their privacy has been violated through the extraction and handling of information), rather than collaborating for the best outcome for all parties.

SUMMARY

Accordingly systems and methods are described herein that address the shortcomings in conventional systems via a novel technique for utilizing a social graph and artificial intelligence to facilitate the exchange of information from a source of the information to a consumer of the information. For example, when a consumer is looking for the best restaurant, the system may connect the consumer with someone who knows about local restaurants. The information exchanged between the individuals and groups of individuals is crowed sourced from friends and trusted members of a social community. For example, the source of the information may be a friend that is in the consumer's social circle or may be a person or entity with which the consumer has not interacted previously. The information may include information about products, content, processes, services, advice, opinions, and other types of conversations between groups and individuals. By providing connecting a consumer of information directly with a trusted source of such information, users can more efficiently gather intelligence and make quick, trusted decisions as compared to using conventional search systems.

In some embodiments, the systems and methods described herein distill the right products, content, and methods for the individuals and communities that would benefit from them. For example, a user is presented with a feed of information based on prior interactions with other users, merchants, brands, etc. thereby empowering and optimizing efficiencies for individuals. Feedback and information may be sourced by or provided by brands. For example, when a group of users is discussing their favorite backpacks, a backpack brand may highlight the features of the brand's backpack and can use the feedback from the consumers to develop and improve the brand's design. In some instances, the systems and methods described herein may provide the group of users with a promotion, such as a discount coupon for the brand's backpack, based on participation in the discussion. By connecting and rewarding the sellers and producers for their achieved product market fit, the systems and methods described herein strengthen the bonds of communities through a collaborative effort.

In some embodiments, the systems and methods described herein and implemented on a social media platform (hereinafter "platform"). The platform may include one or more computers, servers, databases, communication networks, etc. In some embodiments, the platform may organize groups and conversations around questions and/ or recommendations. For example, a group or conversation on the platform may be formed around the question "What is the best backpack?"In another example, a conversation or group on the platform may be formed around the recommendation "I just tried the backpack from Brand X and it was great!" Users of the platform may include consumers, brands, content providers, etc. Users of the platform can organize their chats in real time by sorting or searching. If a user identifies a conversation that is of interest to the user, the user may save or bookmark the conversation to view later. In some instances, the user may set or receive a reminder from the platform to interact with the saved information at a future time. In some embodiments, the social collaboration platform may identify one or more additional actions, such generating directions to a location, launching an order form (e.g., for products or restaurants) and may cause the display of the action.

In some embodiments, the platform personalizes displayed and recommended groups or conversations for the user. For example, the user may be recommended a conversation about backpacks if the user recently displayed interest in backpacks. In some embodiments, the platform utilizes natural language processing ("NLP"), artificial intelligence ("AI"), and/or other machine learning models to connect a user with information that is of interest to the user. For example, when a first user asks "Books for 2 year old" the platform recommends a post called "Favorite books for toddlers" that was posted by a second user. In another example, when a user searches for "Best shows," the platform suggests shows that match the user's demographic, interests, behaviors, followers, etc. as demonstrated within the app or outside of the app.

In some embodiments, the platform can facilitate the creation of polls to simplify the retrieval of information that is of interest to the user. For example, if user A presents a query "What is the best backpack?" the platform may generate a poll comprising two or more popular backpack brands or items. In such instances, the platform lowers the effort required by other users to provide a recommendation to user A. In some instances, the poll listings are generated based on prior queries. For example, the platform may determine that when similar prior posts (e.g., "Best backpack" and "What is your favorite backpack?") were posted to the platform, the conversations that followed included brands A and B. In response to identifying the two brands, the platform may generate a poll comprising brand A and brand B.

As referred to herein, the term "directly in response to" refers to caused by. For example, a first action being performed directly in response to a second action may not include interstitial steps between the first action and the second action.

In some embodiments, the platform may automatically categorize the questions, recommendations, or conversations based on content detected in the text. For example, "Best backpack" may be tagged as fashion, students, outdoors, etc. In some instances, a category has one or more subcategories. For example, fashion may be a parent category for the sub-categories shoes, dresses, blouses, etc.

In some embodiments, the platform sends personalized notifications to the users. For example, when the platform receives a new question or recommendation, the platform identifies one or more users that are interested in the question or recommendation. For example, if a user C posts a recommendation "Best knapsacks for Fall 2020," user A may receive a notification about the recommendation because user A previously asked a question about backpacks. In another example, if user A posts a new question "Where are the best tacos?" the platform may notify user D about the post when the platform determines that user D has expressed an interest in tacos (e.g., by providing taco recommendations in the past, by interacting with a taco related sponsor, by purchasing taco related merchandise, etc.). In some embodiments, if a first user follows a second user, the platform may notify the first user when the second user asks a question or provides a recommendation.

In some embodiments, the platform creates and measures word of mouth reactions and recommendations. For example, when a user posts a positive comment or reaction to a brand, that reaction is saved in a record for the brand. In some instances, the platform uses sentiment analysis to detect and determine the sentiment in typed reactions to products, brands, content, locations, and other users. In some examples, this data is provided to brands, content providers, other users, etc. and may be used by the platform to recommend advertising options to the brands, content providers, other users, etc.

In some embodiments, the platform enables user to filter though content on the platform to display the content that is relevant to the user. In such instances, the platform may store data identifying the filters that were selected by the user. For example, the platform enables a user to see content from only particular individual that the user follows, filter based on location, category (e.g., fashion, food, etc.), topics, life stage, gender, etc. In such examples, the user can send direct messages to those that are associated with a filter or category. For example, a user can send messages to all those that are in the life stage "College."

In some embodiments, the platform enables users to earn status within the platform for contribution and engagement and to connect with elite users and tastemakers. For example, if a first user consistently replies to the questions posted by other users. User A may be presented with promotions accumulate points or other opportunities. In some embodiments, the platform identifies the reply and recommendation pattern by users to identify experts in certain topics and may solicit the user's responses. For example, if a user consistently replies to queries in the "Athletic Shoes" category, the user may be deemed an expert in athletic shoes and may be prompted with user questions when the questions relate to athletic shoes.

In some embodiments, the platform detects urgent requests and may forwards the request to a group of platform employees, moderators, and/or power users of the platform. In such embodiments, the system may detect that the request is urgent based on an urgent flag created by the user or by identifying text in the request. For example, the system may determine that a request is urgent when the request comprises the phrase "Need help now!"

In some embodiments, the platform enables users to perform actions based on the responses or queries. For example, if a user recommends a restaurant, the platform may identify a location of the restaurant and a menu and may provide a link to the menu and location.

In some embodiments, the platform provides an alternative to scroll in chat conversation by identifying the subject(s)/goal(s) of the conversation, highlighting pertinent information within the dialogue, consolidating and organizing the pertinent information into lists/polls/etc., prioritizing the information according to the group behavior, making this information actionable for the users, and allowing this information to be extracted by the user and organized/utilized elsewhere. For example, a user searching for a recommendation can search the index for results that are based on the goal and subjects of the conversations. Such a grouping enables the user to more quickly identify relevant information than using conventional systems.

In some embodiments, the user interface includes one or more of the following features: "Upvoting" and decaying popularity of posts, group members' ability to react to data (both adding to list and moving up/down list), providing emojis or kudos, etc. In such embodiments, the system may identify a "top" recommendation and may depict the recommendation at the top of the list. An exemplary algorithm to decide when top recommendation(s) moves up/down can include user reactions, conversational cues within chat (e.g., "User B's recommendation is the best!", actions taken on items (clicks, purchases, etc.). In some instances, the algorithm may prioritize factors used to identify a top recommendation, such factors may include: Date/time, number of "Upvotes", Saves, shares, emoji sentiment, sentiment detected around the comment/recommendation, user status on the platform, brand mentions around the conversation, previous group discussion, broader platform implications, i.e. discussion from "similar groups."

In some embodiments, the platform adds a layer of organization over messaging and communication platforms in that a consumer action—click, purchase, save, etc. may, in some embodiments, be an end product of each conversation. As an example, organizing an individual's information in one place, the "Saved" section is provided to the user so that the user can quickly retrieve the results of prior communications without having to filter through the conversation itself. In some embodiments, the platform may organize responses to queries by providing polls. In some instances, polls may include an "Agree/Yes" or "Disagree/No" option. In other examples, the polls may be generated based on prior query responses stored on the platform. For example, the platform may generate multiple choice options based on previously recommended brands in response to a query "Best backpacks."

In some embodiments, the platform prioritized organization of user information. In some instances, the platform allows for user control of information. For example, a user can manually save, tag, organize and filter posts in real time. Additionally, the user has control over how to organize data on the platform after the data has already been shared. For example, a user may save a response to the query "Most comfortable shoes for travel" in a personal space called "Gifts for Mom. In some instances, the personal space may be private to the user (or a select group of people to which the user granted shared access) but may comprise information that was shared publicly by other users. In some embodiments, the platform reduces the amount of input required by the user by automatically saving highly rated responses to queries, recommending products, and filtering platform activity based on predicted interests of the user.

In some instances, the platform utilizes a machine learning algorithm and artificial intelligence to analyze a repository of content shared by all users. In such embodiments, the platform may detect and learning latent features from the set of content shared by the users. The features may be stored in a graph data structure wherein latent features are represented by one or more nodes in the graph and are connected by one or more connections having various weights. In some instances, the graph is updated iteratively as new posts, reactions, etc. are entered by users on the system or as new training data is provided to the graph.

In some embodiments, the platform enables users to search or browse global features and get personalized results, based on behaviors within the application, as well as demographic data. This includes but is not limited to brands/products/content discussed, products/content purchased, reactions provided, frequency of interactions and engagement, gender, age, life stage, university, and zip code. Results are populated by the platform based on a proprietary algorithm that ranks these inputs differently, depending on the query and the individual.

In some embodiments, the platform creates a more personal, safe, and contextual space by enabling the following features, group formation, tagging, and @mentioning solve for a variety of communication needs. The ability to direct message other users in lieu of group chat. The ability to invite friends via text or email. The ability to identify phone contacts who have accounts and follow them. The ability to share a referral link and receive credit. The ability to earn status within the platform for contribution and engagement and to connect with elite users and tastemakers. The ability to designate experts in certain topics and solicit their responses. The ability to curate a profile of recommendations and organize them, title them, and add personal reviews. The ability to view the list of followers of yourself and others, and to review their basic information and connect with them on linked social media accounts. The ability to follow users back, to see suggested followers based on demographic and proximity to users.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 depicts a block diagram of an illustrative social collaboration platform, in accordance with some embodiments of the disclosure;

DETAILED DESCRIPTION

Accordingly systems and methods are described herein that address the shortcomings in conventional systems via a novel technique for utilizing a social graph and artificial intelligence to facilitate the exchange of information from a source of the information to a consumer of the information. For example, when a user seeking the best hair salon, the system may connect the user with someone who knows about local salons. The information exchanged between the individuals and groups of individuals is crowed sourced from friends and trusted members of a social community. For example, the source of the information may be a friend that is in the consumer's social circle or may be a person or entity with which the consumer has not interacted previously. The information may include information about products, content, processes, services, advice, opinions, and other types of conversations between groups and individuals. By providing connecting a consumer of information directly with a trusted source of such information, users can more efficiently gather intelligence and make quick, trusted decisions as compared to using conventional search systems.

Figure 1:
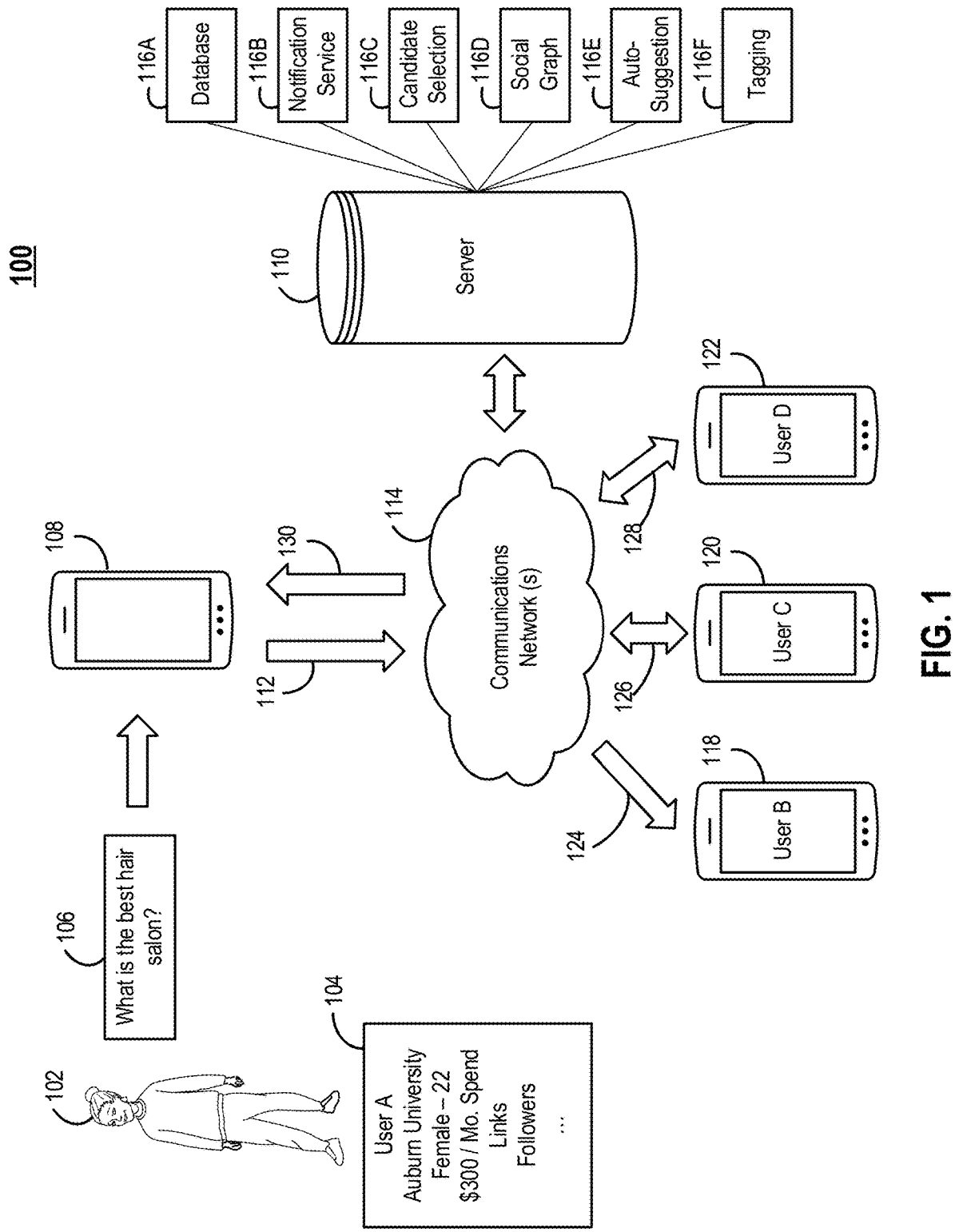
FIG. 1 depicts an illustrative embodiment of a social collaboration platform comprising a query from a user, in accordance with some embodiments of the disclosure.

FIG. 1. Depicts illustrative embodiment of a social collaboration platform comprising a query from a user, in accordance with some embodiments of the present disclosure. Platform 100 is depicted having user 102. User 102 is depicted having user profile 104 comprising profile information that is associated with user 102. In some embodiments, user profile 104 is stored on a server, such as server 110.

In some embodiments, user 102 submits a query (e.g., query 104) to a mobile device of the user (e.g., mobile device 108). For example, user 102 may speak the query and the social collaboration platform will convert the user's speech signal to a text input for the social collaboration platform. In another example, user 102 may enter query 106 via a keyboard of mobile device 108. Although mobile device 108 is depicted as a mobile phone, mobile device may be any device, mobile or stationary, such as a desktop computer, a wearable electronic device. In some embodiments, mobile 108 comprises control circuitry (e.g., control circuitry 328 depicted in FIG. 3) running under the instructions from an application of the social collaboration platform.

In some embodiments, the social collaboration platform running on mobile device 108 will instruct input/output ("I/O") circuitry to transmit the query (e.g., depicted as arrow 112) via communications network 114 to server 110. In some embodiments, server 110 comprises one or more additional components, databases or services, such as database 116A, notification service 116B, candidate selection component 116C, social graph 116D, auto suggestion component 116E, tagging component 116F. In some embodiments, database 116A may store information related to users of the social collaboration platform, such as profile 104 for user 102, information related to previously submitted queries, information related to previously submitted recommendations, etc. In some embodiments, notification service 116B may notify other users, such as User B, User C, and User D of mobile devices 118, 120, and 122, respectively. In some embodiments, candidate selection component 116C selects from a plurality of users in the social collaboration platform to transmit the query. For example, candidate selection component 116C may determine that User B, User C and User D each match with the profile of User A and with query 106 by at least a threshold value. In some embodiments, candidate selection component 116C may coordinate with social graph 116D (discussed further with respect to FIG. 4) to identify candidate users from the social network. Auto suggestion component 116E may analyze previously submitted queries and recommendations (e.g., previously submitted recommendations and queries stored on database 116A) to identify whether any previously submitted information matches the current user query. For example, if the social collaboration platform determines that users of the platform previously recommended salons that are located close to user 102, auto suggestion component 116E may cause for display to user 106 the previously submitted queries (e.g., for display on device 108 via the social collaboration platform application). For example, the previously submitted queries may be transmitted via communications network 114 to device 108 via communication 130.

Arrows 124, 126 and 128 depict incoming and outgoing communications from devices 118, 120, and 122, respectively. In some instances, a single direction arrow is depicted because a user may not have responded to query 106. The depiction of a single direction arrow should not be understood to mean that the device is limited to only one-way communications. However, in some embodiments, it is possible that a device may be able to receive communications but may not be able to respond using the device itself. For example, in an instance of smart glasses, the social collaboration platform may depict a query within the glasses of the user, however, the user may need a second device running the social collaboration platform application, such as a mobile phone, to generate a response. In some instances, the response (e.g., from devices 120 and 122) may be transmitted to device 108 via communications network 114 depicted as communication 130.

In some embodiments, server 110 includes tagging component 116F to tag incoming queries, recommendations, responses by users, etc. In such embodiments, tagging component 116F may analyze the text of post in addition to context corresponding to the post (e.g., profile information about the user that created the post, time of posting, location when posted, etc.) to identify a category corresponding to the post. In such embodiments, tagging component 116F may utilize social graph 116D to analyze the text of a post in conjunction with the context of the post. For example, if the user posts "Where should I eat tonight?"from a location in New York City, the post may be tagged with the categories "Restaurants" and "NYC".

Figure 2A:
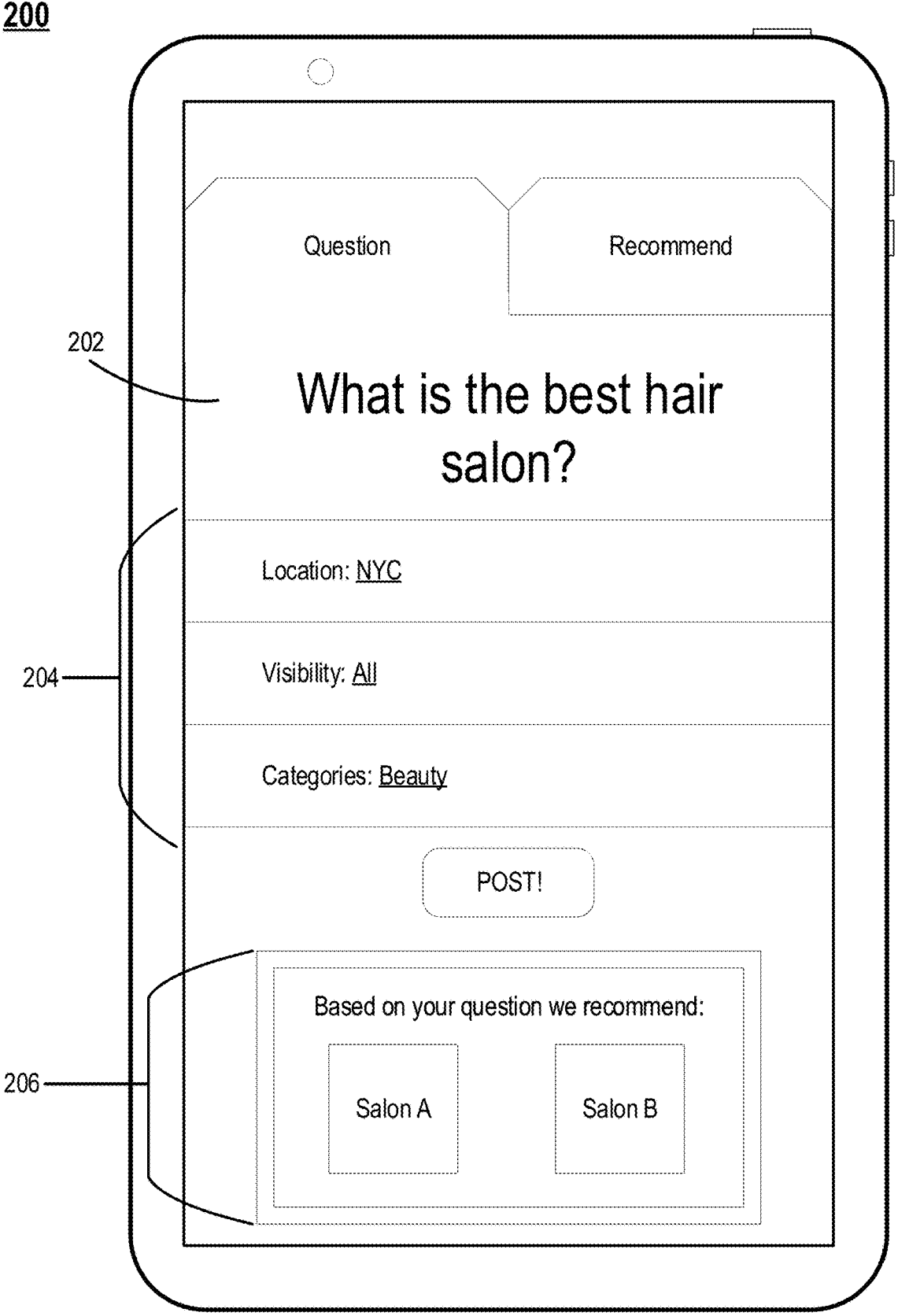
FIG. 2A depicts an illustrative example of a display screen from an application of an exemplary social collaboration platform, in accordance with some embodiments of the disclosure.

FIG. 2A depicts an illustrative example of a display screen from an application of an exemplary social collaboration platform, in accordance with some embodiments of the disclosure. In some embodiments, device 200 is may be device 108 depicted in FIG. 1. In other embodiments device 200 may be any of devices 118, 120, and 122 depicted in FIG. 1. Device 200 is depicted having a query, such as query 106 having various fields, such as question 202 and additional fields 204. In FIG. 2A, question 202, "What is the best hair salon?" may be entered by user 102 using voice input. In some embodiments, additional fields 204 are auto populated by the social collaboration platform based on profile data of user 102, such as profile 104. In other embodiments, user 102 may enter additional fields manually (e.g., using voice or keyboard input). In some embodiments, the social collaboration platform may automatically fill in additional fields 204 based on natural language processing of question 202. For example, the social collaboration platform may determine that the query relates to a salon and therefore belongs to a "Beauty" category (e.g., using social graph 116D of server 110). In some instances, query 106 may comprise one or more of question 202 and additional fields 204.

In some embodiments, the social collaboration platform may recommend responses to the question based on prior recommendations and responses from prior users. For example, the social collaboration platform may recommend one or more salons (e.g., Salon A and Salon B) based on prior responses by users on the social collaboration platform (e.g., using social graph 116D and database 116A storing prior responses).

Figure 2B:
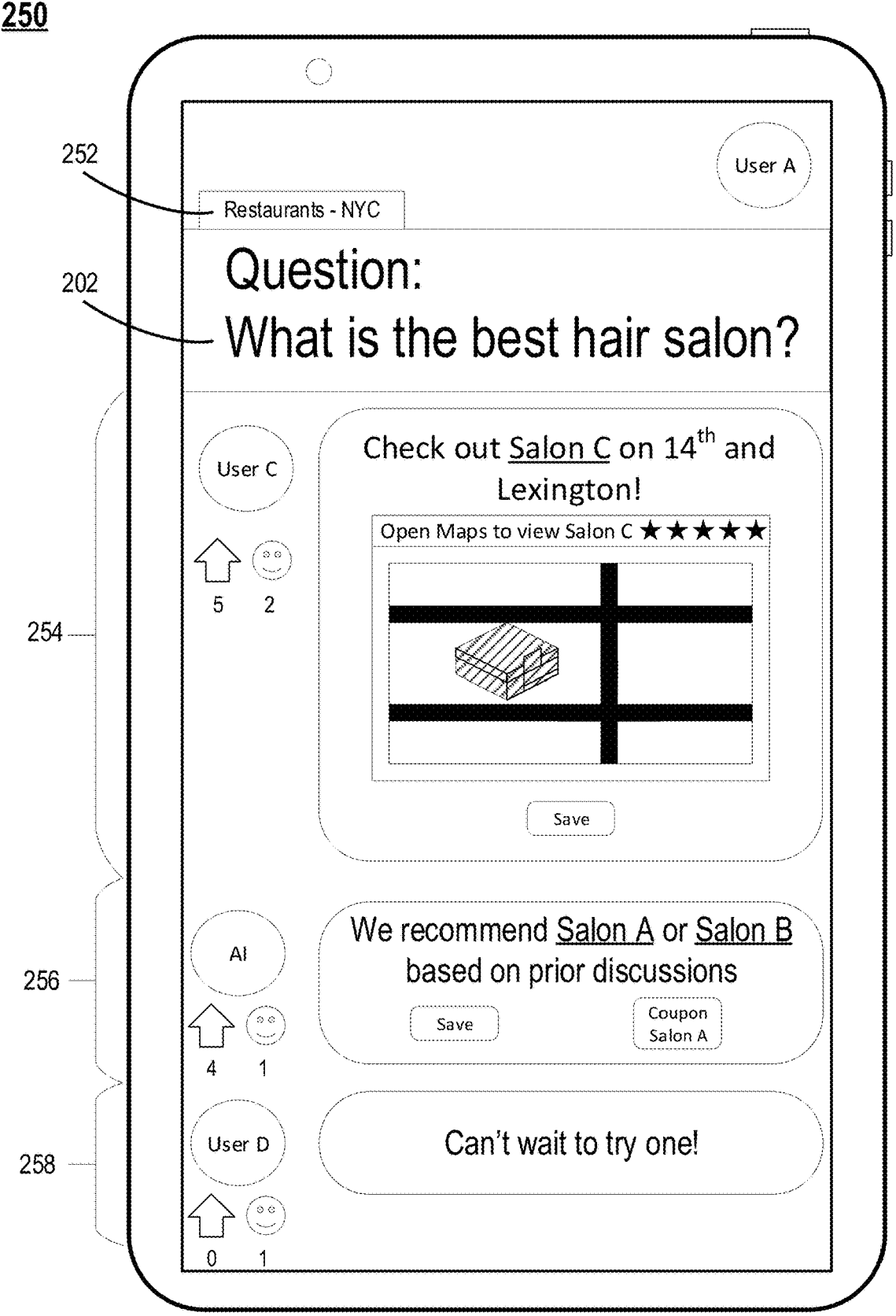
FIG. 2B depicts an illustrative example of a display screen from an application of an exemplary social collaboration platform, in accordance with some embodiments of the disclosure.

FIG. 2B depicts an illustrative example of a display screen from an application of an exemplary social collaboration platform, in accordance with some embodiments of the disclosure. For example, device 250 may be device 108 depicted in FIG. 108. In some instances, a screen similar to that depicted on device 250 may be displayed on any of devices 118, 120 and 122 in response to selecting a notification about query 106 (e.g., from notification service 116B), based on selecting the query from the interface of the social collaboration platform, receiving a recommendation for query 106 from the social collaboration platform, etc.

Although query 106 originates as a communication from a user (e.g., user 102) additional data may be added to query 106 by the social collaboration platform, such as tags 252.

In some embodiments, other users, such as User C and User D may respond to query 106 (e.g., user responses 254 and 258). In some embodiments, the social collaboration platform AI may respond to query 106 (e.g., AI response 256). Each of responses 254, 256 and 257 may comprise an identification of the source of the response (e.g., an icon depicting the name of the user) and may include components for reacting to (e.g., by up-ranking, sending an emoji, saying thanks, etc.) or interacting with the response (e.g., by clinking on a link to save or share the response, access additional information, see a review from a third party service, etc.).

In some embodiments, the social collaboration platform may in response to identifying the two or more entries matching the query (e.g., Salon A and Salon B) generate a poll comprising the two or more entries. For example, in addition to, or instead of response 256, control circuitry may generate for display a poll comprising the two or more entries, thereby allowing users to select from one of the two or more entries instead of providing a textual response to query 106.

In some embodiments, the social collaboration platform may automatically generate links based on text in the responses. For example, when User C states the name of their favorite salon, Salon C, the social collaboration platform may generate a map link to Salon C and may display $3^{rd}$ party information about Salon C. In some embodiments, the social collaboration platform may generate advertisements or promotions based on the query, recommendation or responses. For example, the social collaboration platform may identify a promotion associated with Salon A and may depict a link to the promotion within the response. In some embodiments, in response to determining that the query corresponds to a product, service, or brand, the social collaboration platform may identify a manufacturer or owner associated with the product, service, or brand and may cause a display of a response to the queries to the manufacturer or owner. For example, the owner of Salon A, Salon B, or Salon C may be notified that their salons were identified in the query and may engage in communication with users (e.g., by providing promotions or discussing their brand) with users who are engaged in the query.

In some embodiments, the responses are sorted based on a reaction or quality of the response. For example, a response having a highest number of upvotes, positive reactions, or quality of information (e.g., as determined by social graph 116D) may appear higher on the list and/or may be highlighted as a "Best Answer" (e.g., by changing the coloring, font, an icon, etc.).

In some embodiments, the social collaboration platform may utilize the feedback provided by users (e.g., the upvotes, reactions, responses, etc.) and may generate a score for a user. For example, a user that most frequently posts on a certain topic and/or receives positive feedback on such posts, may be deemed an expert on the topic. For example, in response to User C receiving 5 upvotes and 2 smiles for response 254, the social collaboration platform may increase a cumulative feedback parameter for the user (e.g., a metric storing a rating for the user's responses for various topics).

In some embodiments, in response to a user receiving a high cumulative feedback parameter, the user may receive preferential ranking with a list of responses or may receive additional questions when a user is having difficulty. For example, a user may post "Urgent—need a babysitter tonight!" The social collaboration platform may determine that the post is urgent (e.g., based on analyzing the text, detecting the word urgent, noticing an "urgent" flag, etc.). In response to determining that the post is urgent, the platform may transmit the post to an "expert" such as an individual having a high cumulative feedback parameter. In some instances, users associated with a high cumulative feedback parameter may additionally receive promotions (e.g., promotions based on the category for which they are an "expert") that are unavailable to regular users (e.g., users having an average cumulative feedback parameter.

FIG. 3 is an illustrative block diagram of system 300, which shows additional details of the social collaboration platform 100 of FIG. 1, in accordance with some embodiments of the disclosure. Although FIG. 3 depicts certain components, in various examples, system 300 may include fewer than the illustrated components and/or multiples of one or more of the illustrated components. System 300 includes server 302 (e.g., server 110 of FIG. 1), local database 306 and local components/services 304, each of which is communicatively coupled to server 302. In some embodiments, local database 306 or local components/services 304 may be implemented locally on server 302 (e.g., via storage 324 or processing circuitry 326 (collectively control circuitry 320) In some embodiments, system 300 excludes server 302 and functionality that would otherwise be implemented by server 302 is instead implemented by other components of system 300, such as computing device 318 (e.g., devices 108, 118, 120, or 122 of FIG. 1). In still other embodiments, server 302 works in conjunction with computing device 318 to implement certain functionality described herein in a distributed or cooperative manner.

Server 302 includes control circuitry 320 and I/O path 322, and control circuitry 320 includes storage 324 and processing circuitry 326. Computing device 318, which may be a personal computer, a laptop computer, a tablet computer, a smartphone, or any other type of computing device, includes control circuitry 328, I/O path 330, speaker 332, display 334, and user input interface 336. Control circuitry 328 includes storage 338 and processing circuitry 340. Control circuitry 320 and/or 328 may be based on any suitable processing circuitry such as processing circuitry 326 and/or 340. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., hexa-core, or any suitable number of cores). In some embodiments, processing circuitry may be distributed across multiple separate processors, for example, multiple of the same type of processors (e.g., two Intel Core i9 processors) or multiple different processors (e.g., an Intel processor and an AMD processor). In some embodiments, control circuitry 320 and/or control circuitry 328 are configured to implement the social collaboration platform described herein. In some embodiments, control circuitry 320 is configured to implement any of databases, services or components 116-A-F depicted in FIG. 1. In some embodiments, services/components 116B-F may be implemented locally to server 302 (e.g., as local components/services 304 or remote from server 302, such as network components/services 312). In some embodiments, server 302 communicates with network components/services 312 and network database 310 via communications networks 314, which may be the Internet and/or a local area network. In some instances, server 302 communicates with a $3^{rd}$ party server (e.g., $3^{rd}$ party server 308) to provide supplemental information regarding posts, responses, questions, queries, recommendations, etc. on the social collaboration platform.

Each of storage 324, storage 338, and/or storages of other components of system 300 (e.g., storages of database 306 or 310 and/or the like) may be an electronic storage device. As referred to herein, the phrase "electronic storage device" or "storage device" should be understood to mean any device for storing electronic data, computer software, or firmware, such as random-access memory, read-only memory, hard drives, solid state, quantum storage or any other suitable fixed or removable storage devices, and/or any combination of the same. Each of storage 324, storage 338, and/or storages of other components of system 300 may be used to store various types of content, posts, user data, recommendations, and or other types of data. Non-volatile memory may also be used (e.g., to launch a boot-up routine and other instructions). Cloud-based storage may be used to supplement storages 324, 338 or instead of storages 324, 338 (e.g., network database 310). In some embodiments, control circuitry 320 and/or 328 executes instructions for an application stored in memory (e.g., storage 324 and/or 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an Internet resource). Control circuitry 328 may retrieve instructions for the application from storage 338 and process the instructions to perform the functionality described herein. Based on the processed instructions, control circuitry 328 may determine what action to perform when input is received from user input interface 336.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 320) and/or generate displays. Computing device 318 may receive the displays generated by the remote server and may display the content of the displays locally via display 334. This way, the processing of the instructions is performed remotely (e.g., by server 302) while the resulting displays, such as the display windows described elsewhere herein, are provided locally on computing device 318. Computing device 318 may receive inputs from the user via input interface 336 and transmit those inputs to the remote server for processing and generating the corresponding displays.

In some instances, computing device 318 may be communicatively coupled to an auxiliary device, such as a wearable (e.g., auxiliary device 316). In such instances, auxiliary device 316 may comprise all or some of the components of computing device 318 and may implement some or all the functions implemented by computing device 318.

A user may send instructions to control circuitry 320 and/or 328 using user input interface 336. User input interface 336 may be any suitable user interface, such as a remote control, trackball, keypad, keyboard, touchscreen, touchpad, stylus input, joystick, voice recognition interface, a gaming controller, or other user input interfaces. User input interface 336 may be integrated with or combined with display 334, which may be a liquid crystal display (LCD), or any other equipment suitable for displaying visual images.

Server 302 and computing device 318 may transmit and receive content and data via input/output (hereinafter "I/O") path 322 and 330, respectively. For instance, I/O path 322 and/or I/O path 330 may include a communication port configured to receive communications via communication network 314, and/or to communicate to send and receive commands, requests, and other suitable data using I/O paths 322, 330.

Figure 4:
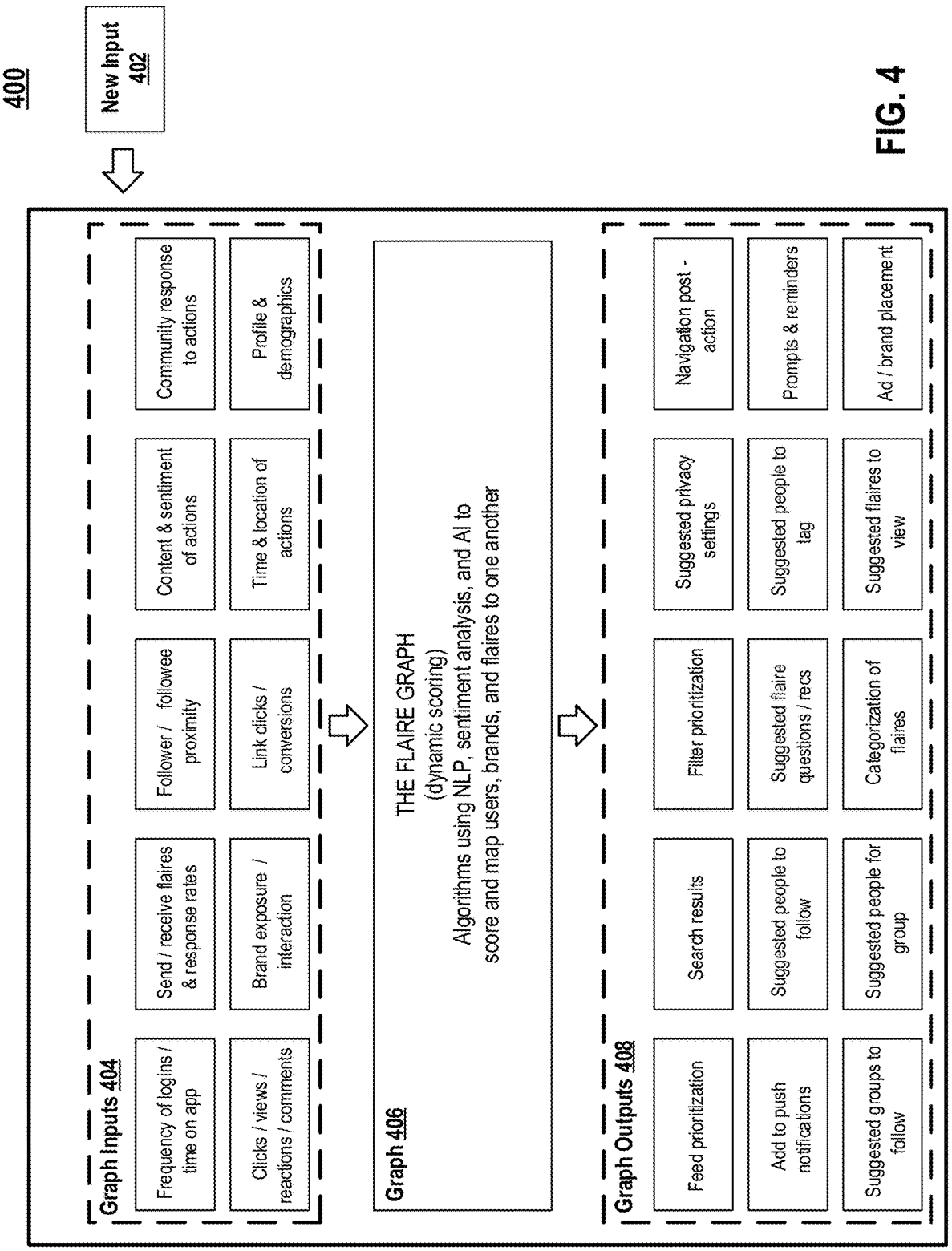
FIG. 4 depicts an exemplary neural processing engine, in accordance with some embodiments of the disclosure.

FIG. 4 depicts exemplary neural processing engine 400, in accordance with some embodiments of the disclosure. In some embodiments, neural processing engine 400 may be implemented on control circuitry, such as control circuitry 320 or control circuitry 328 of FIG. 3. The control circuitry may utilize neural processing engine 400 to identify, predict, maintain and/or detect latent features based on the inputs depicted as graph inputs 404. For example, the control circuitry may receive an input, such as query 106 comprising the text "What is the best hair salon?" in addition to context about the query, such as information from profile 104 and information about the origin of the query (e.g., an origin location, time, device, etc.). The control circuitry may identify embeddings for each word of the plurality of words in the query. For example, the control circuitry may identify pairs of word in the query such as "best" and "hair salon". The control circuitry may input the word embeddings, along with the context and profile information as graph inputs 404. Although a plurality of graph inputs is shown, in some instances, fewer than all graph inputs are used. In some instances, additional graph inputs beyond those depicted as graph inputs 404 are included. The control circuitry may provide the graph inputs as inputs to graph 406. In some embodiments, graph 406 comprises a plurality of weights associated with nodes in a graph. For example, graph 406 may comprise a plurality of word embeddings and associations between the various graph inputs (e.g., graph inputs 404). In some instances, graph 406 may apply dynamic scoring to the inputs (e.g., based on the stored weights) to detect graph outputs (e.g., graph outputs 408). For example, a graph output may be a plurality of users that have profiles matching new input 402. For example, when new input 402 is applied as graph inputs 404 to graph 406, graph 406 may score each user (e.g., based on how closely text, a profile, or other parameters of new input 402 correspond to data pertaining to each user) in the social collaboration platform and may return a subset of the users comprising a score over a predetermined value. For example, for the query "What is the best hair salon?" when tagged NYC may result in a low score for a user who has never been to NYC but may result in a high score for a user who lives in NYC. While a list of users in only an exemplary example of a graph output multiple combinations of graph outputs are possible (e.g., graph outputs 408). Additional discussion with respect to the possible graph outputs and uses and implementations of neural processing engine 400 are described in detail in the '565 Provisional Application and the '380 Provisional Application, which are both incorporated by reference herein in its entirety above.

In some embodiments, graph output 408 comprises semantic features corresponding to the plurality of words in the query. For example, for query 106, the semantic features may identify the query as a search for hair salons in the NYC area that are highly rated. In response to determining the semantic features, the social collaboration platform may select the subject matter of the query and may identify a tag or may transmit the query to other users (e.g., experts) who have interacted with the identified subject matter.

In some embodiments, new input 402 may comprise feedback for one or more users. For example, in response to providing an upvote for reply 254, control circuitry may provide the upvote as new input 402. New input may update a cumulative feedback parameter for the second user based on the received feedback (e.g., from the first user) (discussed further with respect to FIG. 7).

Figure 5:
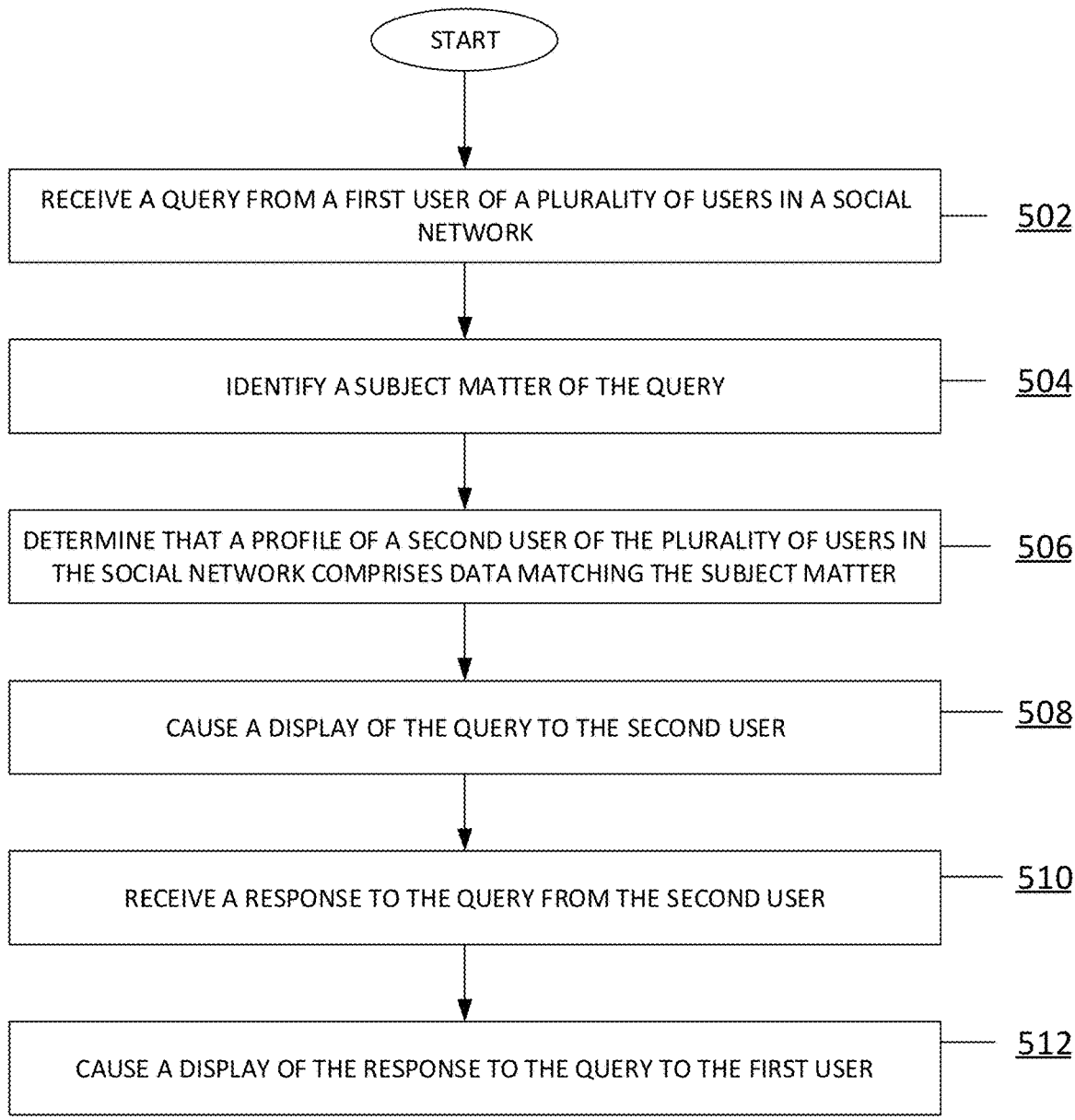
FIG. 5 depicts an illustrative process for determining identify a candidate user for a query, in accordance with some embodiments of the disclosure.

FIG. 5 depicts an illustrative process implemented by control circuitry (e.g., control circuitry 320 or 328) for determining identify a candidate user for a query, in accordance with some embodiments of the disclosure. Process 500 begins at 502 where control circuitry receives a query from a first user of a plurality of users in a social network. For example, control circuitry may receive query 106 from user 102 of social collaboration platform 100. In some instances, query 106 is received by server 302 or server 110 via communications network 114 or 314 by device 108 or 318.

Figure 6:
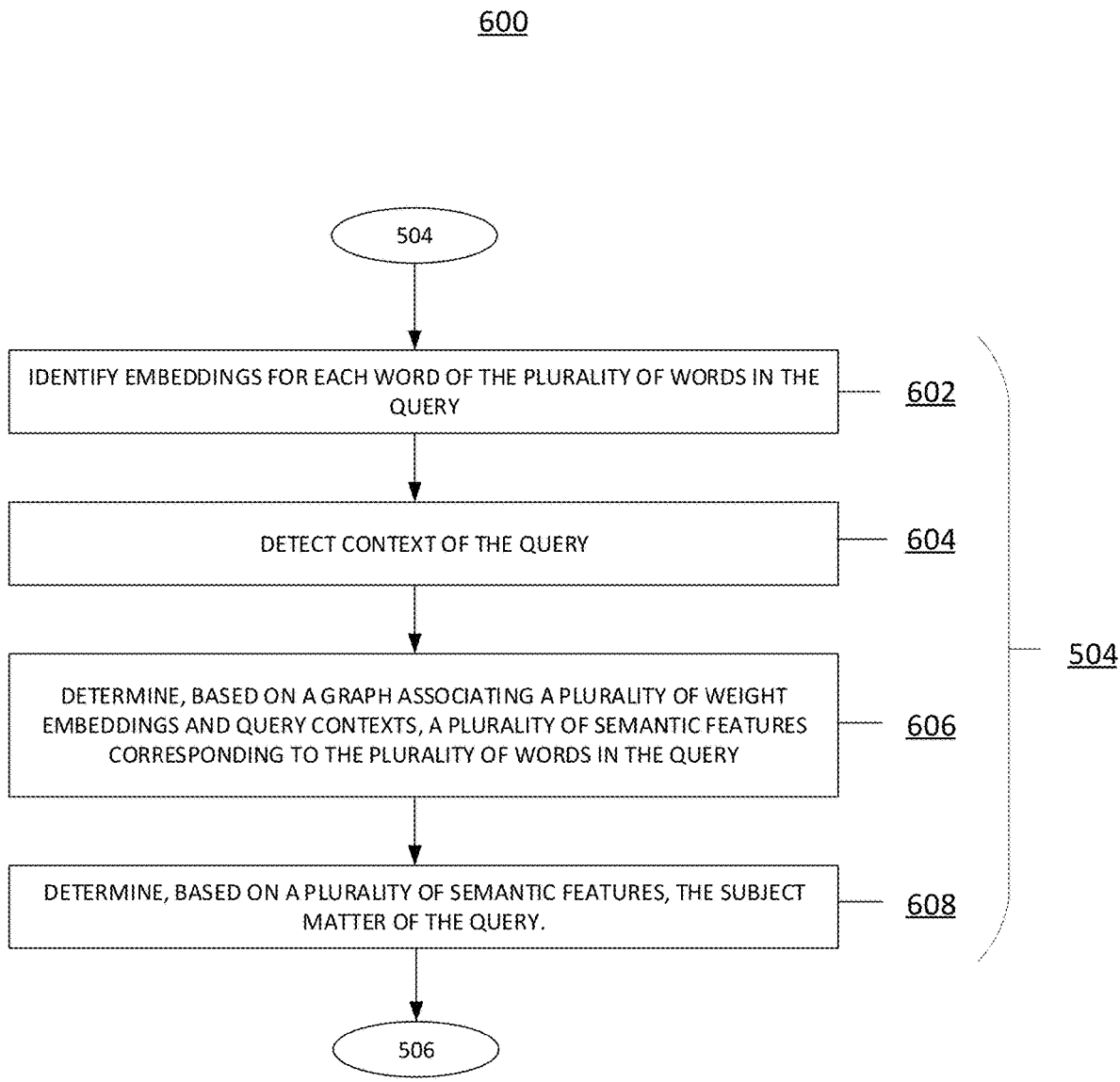
FIG. 6 depicts an illustrative process for determining a word embedding, in accordance with some embodiments of the present disclosure.

At 504 control circuitry identifies a subject matter of the query. An exemplary process 600 where control circuitry identifies the subject matter of a query (e.g., query 106) using the neural processing engine 400 is discussed further below with respect to process 600 (FIG. 6).

At 506 control circuitry determines that a profile of a second user of the plurality of users in the social network comprises data matching the subject matter. For example, control circuitry may determine e.g., based on neural processing engine 400, that the second user matches a profile of the user (e.g., both from NYC) and matches a portion of query 106 (e.g., frequently provides recommendations for salons). In response to the determining, the control circuitry may select the second user as a candidate user for responding to query 106.

At 508 control circuitry causes the display of the query to the second user. For example, control circuitry may cause the display (e.g., on display 334) of the query on device 118, 120, and 122 via communications network 114/314. In such instances, control circuitry may cause the display of the query by, for example, providing a notification to the user (e.g., using notification service 116B) or by causing the query to appear in a feed of the user (e.g., based on an output from candidate selection 116C or social graph 116D.

At 510 control circuitry receives a response to the query form the second user. For example, control circuitry may receive a response via networks 114/312 from devices 120, 122 or 318. In such instances, control circuitry may display the response as a user response (e.g., user responses 254 or 258).

At 512 control circuitry causes a display of the response to the query to the first user. For example, control circuitry may cause the display the response to the query as depicted in FIG. 2B, may provide a notification to User A (e.g., via a text message, email or application notification). In some embodiments, the response to the query or the query itself is adapted based on the display capabilities of the device. For example, when the user is using an wearable device, such as a watch (e.g., auxiliary device 316), control circuitry may modify the response or the query to display only a most important portion (e.g., based on the preferences of the user based on an output from neural processing engine 400) of the response or query. For example, due to the limited display space of a wearable device, control circuitry may only display the name and address of Salon C in response to receiving response 254 instead of displaying a full map view and supplemental information (as depicted in FIG. 2B).

FIG. 6 depicts an illustrative process for determining a word embedding, in accordance with some embodiments of the present disclosure. Process 600 begins at 502 where control circuitry identifies the subject matter of the query. For example, at 602 control circuitry identifies embeddings for each word of the plurality of words in the query. The control circuitry may identify embeddings for each word of the plurality of words in the query. For example, the control circuitry may identify pairs of word in the query such as "best" and "hair salon". The control circuitry may input the word embeddings, along with the context and profile information as graph inputs 404. In response to providing the word embeddings as inputs to neural processing engine 400, control circuitry may receive an output.

At 604 control circuitry detects the context of the query, for example, at 604 control circuitry may identify context of the query such as a location that the query was entered (e.g., NYC) or a time where the query was provided by user 102. In some instances, additional graph inputs beyond those depicted as graph inputs 404 are included and are provided as the context detected at 604.

At 606 control circuitry determines, based on a graph associating a plurality of weight embeddings and query contexts (e.g., neural processing engine 400), a plurality of semantic features corresponding to the plurality of words in the query. For example, control circuitry may determine, based on weights associated with nodes in a graph 404, semantic features corresponding to the query (e.g., that the query relates to NYC salons).

At 608 control circuitry determines, based on a plurality of semantic features, the subject matter of the query. For example, control circuitry may determine based on the plurality of semantic features that the user is targeting other users in NYC that go to salons. Control circuitry may further determine, based on the semantic features and profiles of other users, that a user (e.g., users matching a demographic group or identify) are the best candidates for transmitting the query and soliciting a response.

Figure 7:
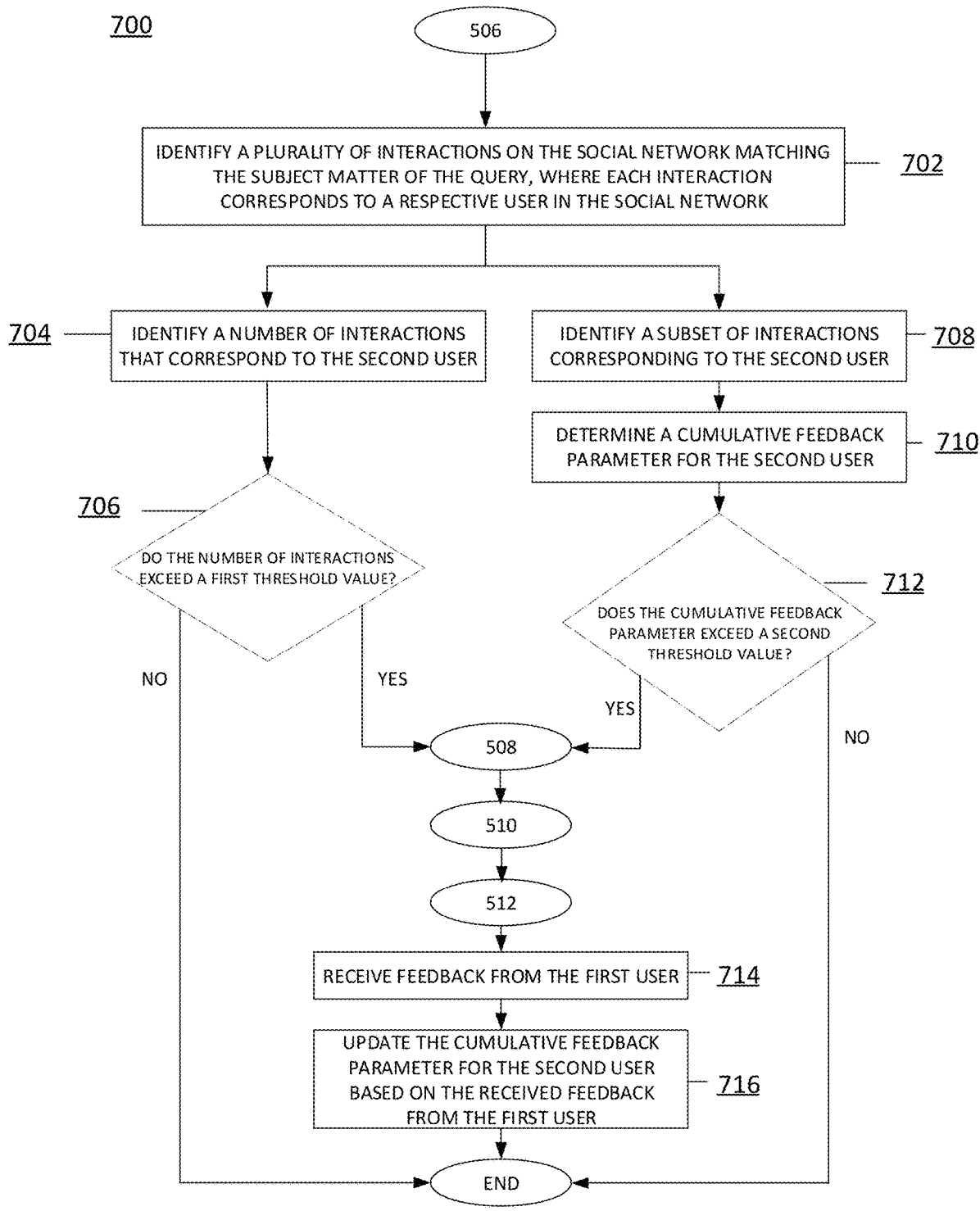
FIG. 7 depicts an additional illustrative process for identifying a candidate user for a query, in accordance with some embodiments of the disclosure.

FIG. 7 depicts an additional illustrative process for identifying a candidate user for a query, in accordance with some embodiments of the disclosure. Process 700 begins at 506 where control circuitry determines that a profile of the second user of the plurality of users in the social network comprises data matching the subject matter. For example, in process 700, control circuitry may identify "experts" in a subject matter either based on a frequency of interacting with a subject matter and/or based on feed received for responses corresponding to the subject matter.

At 702 control circuitry identifies a plurality of interactions on the social network matching the subject matter of the query, where each interaction corresponds to a respective user in the social network. For example, control circuitry may identify multiple prior responses, queries, recommendations, etc. (e.g., stored on database 306 or database 310) that match the subject matter of query 106 (e.g., salons in NYC).

At 704 control circuitry identifies a number of interactions that correspond to the second user. For example, control circuitry may determine that the second user frequently posts about salons by retrieving all salon related posts from database 306 or 312 and determining that the second user is the most frequent poster.

At 706 control circuitry determines whether the number of interactions exceeds the first threshold value. For example, the first threshold value may be determined relative to the number of interactions within a subject matter. For example, If the second user is associated with 90% of the posts within the NYC Salon category, the user may exceed the first threshold value. In other instances where the second user is only associated with 5% of the posts within the NYC salon category, but is the most frequent poster, control circuitry may determine that the user exceeds the first threshold value. The first threshold value may dynamically change and update based on a total number of posts.

If control circuitry determines, at 706, that the number of interactions does not exceed the first threshold value, control circuitry proceeds terminates process 700. If control circuitry determines that the number of interactions does exceed the first threshold value, control circuitry proceeds to 508 as discussed with respect to FIG. 5.

At 708 control circuitry identifies a subset of interactions corresponding to the second user. For example, as discussed with respect to 704, control circuitry may retrieve the interactions of the second user from a database (e.g., database 306 or 312).

At 710 control circuitry determines a cumulative feedback parameter for the second user. For example, control circuitry may determine that all of the second user's posts 90% receive positive feedback. In such instances, control circuitry may determine that the user has a high cumulative feedback parameter. In instances where the second user receives frequent negative feedback, or no feedback at all, control circuitry may determine that the user has a negative or neutral cumulative feedback parameter.

At 712 control circuitry determines whether the cumulative feedback parameter exceeds a second threshold value. For example, control circuitry may determine that the cumulative feedback parameter is greater than that of the second user's peers (e.g., within the subject matter of NYC restaurants) that the user has a cumulative feedback parameter exceeding the second threshold value and proceeds to 508. In contrast, when the user has a cumulative feedback parameter that is lower than his/her peers, control circuitry may determine that the user's cumulative feedback parameter does not exceed the second threshold value and proceeds to terminate process 700.

At 714, control circuitry receives feedback form the first user. For example, control circuitry may receive positive feedback from the first user when the user saves the response by the second user. In some instances, the feedback is provided to neural processing engine 400 to update a cumulative feedback parameter for the second user in response to receiving the feedback at 716.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for facilitating social recommendations in a network, the method comprising:
   receiving a first query from a first user of a plurality of users in a social network;
   identifying a subject matter of the first query;
   determining that one or more profiles of one or more users of the plurality of users in the social network comprise data matching the subject matter;
   in response to determining that the one or more profiles of the one or more users comprise the data matching the subject matter, causing a display of the first query to the one or more users;
   in response to the causing the display of the first query to the one or more users, receiving one or more responses to the first query from the one or more users;
   in response to receiving the one or more responses to the first query from the one or more users, identifying, based on texts of the one or more responses without user input, at least one network resource associated with the texts of the one or more responses;
   causing a display of the one or more responses to the first query to the first user, wherein the display of the one or more responses to the first query comprises at least one selectable link to the at least one network resource;
   adding the one or more responses to the first query to a graph;
   receiving, subsequent to receiving the first query, a second query from a second user;
   determining that the second query matches the subject matter; and
   in response to determining that the second query matches the subject matter, causing a display of the one or more responses from the graph.

2. The method of claim 1, wherein, prior to receiving the first query, the first user has not interacted with the one or more users in the social network.

3. The method of claim 1, wherein the first query comprises a plurality of words, and wherein identifying the subject matter of the first query comprises:
   identifying embeddings for each word of the plurality of words in the first query;
   detecting a context of the first query;
   determining, based on the graph, wherein the graph comprises a plurality of weights associating a plurality of word embeddings and query contexts, a plurality of semantic features corresponding to the plurality of words in the first query;
   determining, based on the plurality of semantic features, the subject matter of the first query.

4. The method of claim 1, wherein causing the display of the first query to the one or more users comprises:
   identifying a plurality of interactions on the social network matching the subject matter of the first query, wherein each interaction of the plurality of interactions corresponds to a respective user of the plurality of users in the social network;
   identifying a number of interactions, of the plurality of interactions, that correspond to a third user;

determining that the number of interactions exceeds a first threshold value; and in response to determining that the number of interactions exceeds the first threshold value, causing the display of the first query to the third user.

5. The method of claim 4, wherein each interaction of the plurality of interactions is further associated with a respective feedback parameter, further comprising:

identifying a subset of interactions, of the plurality of interactions, corresponding to the third user;

determining a cumulative feedback parameter for the third user based on the respective feedback parameter associated with each interaction of the subset of interactions; and wherein causing the display of the first query to the third user further comprises determining that the cumulative feedback parameter exceeds a second threshold value.

6. The method of claim 5, further comprising:

in response to causing the display of the one or more responses to the first query to the first user, receiving feedback from the first user; and updating the cumulative feedback parameter for the third user based on the received feedback from the first user.

7. The method of claim 1, further comprising:

identifying a subset of users of the plurality of users in the social network wherein a degree of separation between the first user and each user of the subset of users is one;

causing a display of the first query to each user of the subset of users based on:

detecting a respective display parameter corresponding to a respective device of each respective user of the subset of users;

modifying the first query based on the respective display parameter; and causing a display of the modified first query to the respective user.

8. The method of claim 1, further comprising:

searching a database for two or more entries matching the first query;

in response to identifying the two or more entries matching the first query, generating a poll comprising the two or more entries; and wherein the causing the display of the first query to the one or more users, further comprises generating for display the poll comprising the two or more entries.

9. The method of claim 1, further comprising:

determining, based on the identified subject matter of the first query, that the first query corresponds to a product;

in response to determining that the first query corresponds to the product, identifying a manufacturer associated with the product; and causing a display of the one or more responses to the first query to the manufacturer.

10. A system for facilitating social recommendations, the system comprising:

input output circuitry communicatively coupled to a network; and control circuitry configured to:

receive a first query from a first user of a plurality of users in a social network;

identify a subject matter of the first query;

determine that one or more profiles of one or more users of the plurality of users in the social network comprise data matching the subject matter;

in response to determining that the one or more profiles of the one or more users comprise the data matching the subject matter, cause a display of the first query to the one or more users;

in response to the causing the display the first query to the one or more users, receive one or more responses to the first query from the one or more users;

in response to receiving the one or more responses to the first query from the one or more users, identify, based on texts of the one or more responses without user input, at least one network resource associated with the texts of the one or more responses;

cause a display of the one or more responses to the first query to the first user, wherein the display of the one or more responses to the first query comprises at least one selectable link to the at least one network resource;

adding the one or more responses to the first query to a graph;

receiving, subsequent to receiving the first query, a second query from a second user;

determining that the second query matches the subject matter; and in response to determining that the second query matches the subject matter, causing a display of the one or more responses from the graph.

11. The system of claim 10, wherein, prior to receiving the first query, the first user has not interacted with the one or more users in the social network.

12. The system of claim 10, wherein the first query comprises a plurality of words, and wherein the control circuitry is further configured, when identifying the subject matter of the first query, to:

identify embeddings for each word of the plurality of words in the first query;

detect a context of the first query;

determine, based on the graph, wherein the graph comprises a plurality of weights associating a plurality of word embeddings and query contexts, a plurality of semantic features corresponding to the plurality of words in the first query;

determine, based on the plurality of semantic features the subject matter of the first query.

13. The system of claim 10, wherein the control circuitry is further configured, when causing the display of the first query to the one or more users, to:

identify a plurality of interactions on the social network matching the subject matter of the first query, wherein each interaction of the plurality of interactions corresponds to a respective user of the plurality of users in the social network;

identify a number of interactions, of the plurality of interactions, that correspond to a third user;

determining that the number of interactions exceeds a first threshold value; and in response to determining that the number of interactions exceeds the first threshold value, causing a display of the first query to the third user.

14. The system of claim 13, wherein each interaction of the plurality of interactions is further associated with a respective feedback parameter, and wherein the control circuitry is further configured to:

identify a subset of interactions, of the plurality of interactions, corresponding to the second user;

determine a cumulative feedback parameter for the third user based on the respective feedback parameter associated with each interaction of the subset of interactions; and wherein the control circuitry is further configured, when causing a display of the first query to the third user, to determine that the cumulative feedback parameter exceeds a second threshold value.

15. The system of claim 14, wherein the control circuitry is further configured to:

in response to causing the display of the one or more responses to the first query to the first user, receive feedback from the first user; and update the cumulative feedback parameter for the third user based on the received feedback from the first user.

16. The system of claim 10, wherein the control circuitry is further configured to:

identify a subset of users of the plurality of users in the social network wherein a degree of separation between the first user and each user of the subset of users is one;

cause a display of the first query to each user of the subset of users based on:

detecting a respective display parameter corresponding to a respective device of each respective user of the subset of users;

modifying the first query based on the respective display parameter; and causing a display of the modified first query to the respective user.

17. The system of claim 10, wherein the control circuitry is further configured to:

search a database for two or more entries matching the first query;

in response to identifying the two or more entries matching the first query, generate a poll comprising the two or more entries; and wherein the control circuitry is further configured, when causing the display of the first query to the one or more users, to generate for display the poll comprising the two or more entries.

18. The system of claim 10, wherein the control circuitry is further configured to:

determine, based on the identified subject matter of the first query, that the first query corresponds to a product;

in response to determining that the first query corresponds to the product, identify a manufacturer associated with the product; and cause a display of the one or more responses to the first query to the manufacturer.

* * * * *